US012475202B2

(12) United States Patent
Katz

(10) Patent No.: US 12,475,202 B2
(45) Date of Patent: Nov. 18, 2025

(54) BENDING ESTIMATION AS A BIOMETRIC SIGNAL

(71) Applicant: Snap Inc., Santa Monica, CA (US)

(72) Inventor: Sagi Katz, Yokneam Ilit (IL)

(73) Assignee: SNAP INC., Santa Monica, CA (US)

(*) Notice: Subject to any disclaimer, the term of this patent is extended or adjusted under 35 U.S.C. 154(b) by 449 days.

(21) Appl. No.: 17/489,394

(22) Filed: Sep. 29, 2021

(65) Prior Publication Data

US 2022/0374505 A1 Nov. 24, 2022

Related U.S. Application Data

(60) Provisional application No. 63/189,944, filed on May 18, 2021.

(51) Int. Cl.
*G06F 21/32* (2013.01)
*G06F 1/16* (2006.01)
*G06T 7/593* (2017.01)
*H04N 13/344* (2018.01)
*G06V 40/16* (2022.01)
*G06V 40/19* (2022.01)
*G06V 40/70* (2022.01)

(52) U.S. Cl.
CPC .............. *G06F 21/32* (2013.01); *G06F 1/163* (2013.01); *G06T 7/593* (2017.01); *H04N 13/344* (2018.05); *G06V 40/171* (2022.01); *G06V 40/19* (2022.01); *G06V 40/70* (2022.01)

(58) Field of Classification Search
None
See application file for complete search history.

(56) References Cited

U.S. PATENT DOCUMENTS

| | | | |
|---|---|---|---|
| 9,876,788 B1* | 1/2018 | Ziraknejad | G06F 21/34 |
| 11,294,188 B1* | 4/2022 | Birklbauer | G06F 3/0346 |
| 12,271,517 B1 | 4/2025 | Faeulhammer et al. | |
| 2014/0018166 A1* | 1/2014 | Guild | G07F 17/3206 |
| | | | 463/31 |
| 2019/0183430 A1* | 6/2019 | Alphonse | A61B 5/1118 |
| 2020/0034739 A1* | 1/2020 | Chung | G16H 50/30 |
| 2020/0043236 A1* | 2/2020 | Miller | H04N 13/398 |
| 2022/0334649 A1 | 10/2022 | Hwang et al. | |

(Continued)

FOREIGN PATENT DOCUMENTS

| | | | | |
|---|---|---|---|---|
| CN | 117425889 A | | 1/2024 | |
| EP | 3834109 A1 * | | 6/2021 | A24F 40/50 |

(Continued)

OTHER PUBLICATIONS

"International Application Serial No. PCT US2022 072338, International Search Report mailed Aug. 23, 2022", 5 pgs.

(Continued)

*Primary Examiner* — Jeffrey C Pwu
*Assistant Examiner* — Mayasa A. Shaawat
(74) *Attorney, Agent, or Firm* — SCHWEGMAN LUNDBERG & WOESSNER, P.A.

(57) ABSTRACT

A method for generating reference biometric data based on a bending of a flexible device is described. In one aspect, a method includes forming training data includes bending estimates of a flexible device worn by a first user, training a model based on the training data, and generating reference biometric data for the first user based on the model.

17 Claims, 15 Drawing Sheets

(56) References Cited

U.S. PATENT DOCUMENTS

| | | |
|---|---|---|
| 2022/0385881 A1 | 12/2022 | Wu et al. |
| 2025/0110547 A1 | 4/2025 | Faeulhammer et al. |
| 2025/0190050 A1 | 6/2025 | Faeulhammer et al. |

FOREIGN PATENT DOCUMENTS

| | | | |
|---|---|---|---|
| KR | 20200011818 | 2/2020 | |
| WO | 2019018396 | 1/2019 | |
| WO | WO-2019018396 A1 * | 1/2019 | ......... G02B 27/0101 |
| WO | 2020161456 | 8/2020 | |
| WO | WO-2022246382 A1 | 11/2022 | |
| WO | 2023031633 | 3/2023 | |
| WO | 2025072727 | 4/2025 | |

OTHER PUBLICATIONS

"International Application Serial No. PCT US2022 072338, Written Opinion mailed Aug. 23, 2022", 6 pgs.

Ferro, M, "A Sensing Seat for Human Authentication", IEEE Transactions on Information Forensics and Security, IEEE, USA, vol. 4, No. 3, (Sep. 1, 2009), 451-459.

"International Application Serial No. PCT/US2022/072338, International Preliminary Report on Patentability mailed Nov. 30, 2023", 8 pgs.

"U.S. Appl. No. 18/478,352, Notice of Allowance mailed Nov. 22, 2024", 10 pgs.

"U.S. Appl. No. 18/478,352, Supplemental Notice of Allowability mailed Dec. 11, 2024", 2 pgs.

"International Application Serial No. PCT US2024 048934, International Search Report mailed Dec. 18, 2024", 5 pgs.

"International Application Serial No. PCT US2024 048934, Written Opinion mailed Dec. 18, 2024", 8 pgs.

"U.S. Appl. No. 18/478,352, Supplemental Notice of Allowability mailed Jan. 22, 2025", 2 pgs.

"U.S. Appl. No. 18/478,352, 312 Amendment filed Feb. 18, 2025", 3 pgs.

"Korean Application Serial No. 10-2023-7043024, Notice of Preliminary Rejection mailed Feb. 11, 2025", w English translation, 15 pgs.

"U.S. Appl. No. 18/478,352, PTO Response to Rule 312 Communication mailed Mar. 14, 2025", 2 pgs.

* cited by examiner

BENDING ESTIMATION AS A BIOMETRIC SIGNAL

RELATED APPLICATION

The present application claims priority to U.S. Provisional Patent Application Ser. No. 63/189,944, filed May 18, 2021, which is hereby incorporated by reference in its entirety.

TECHNICAL FIELD

The subject matter disclosed herein generally relates to a visual tracking system. Specifically, the present disclosure addresses systems and methods for generating a biometric signal based on bending estimation of the visual tracking system.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
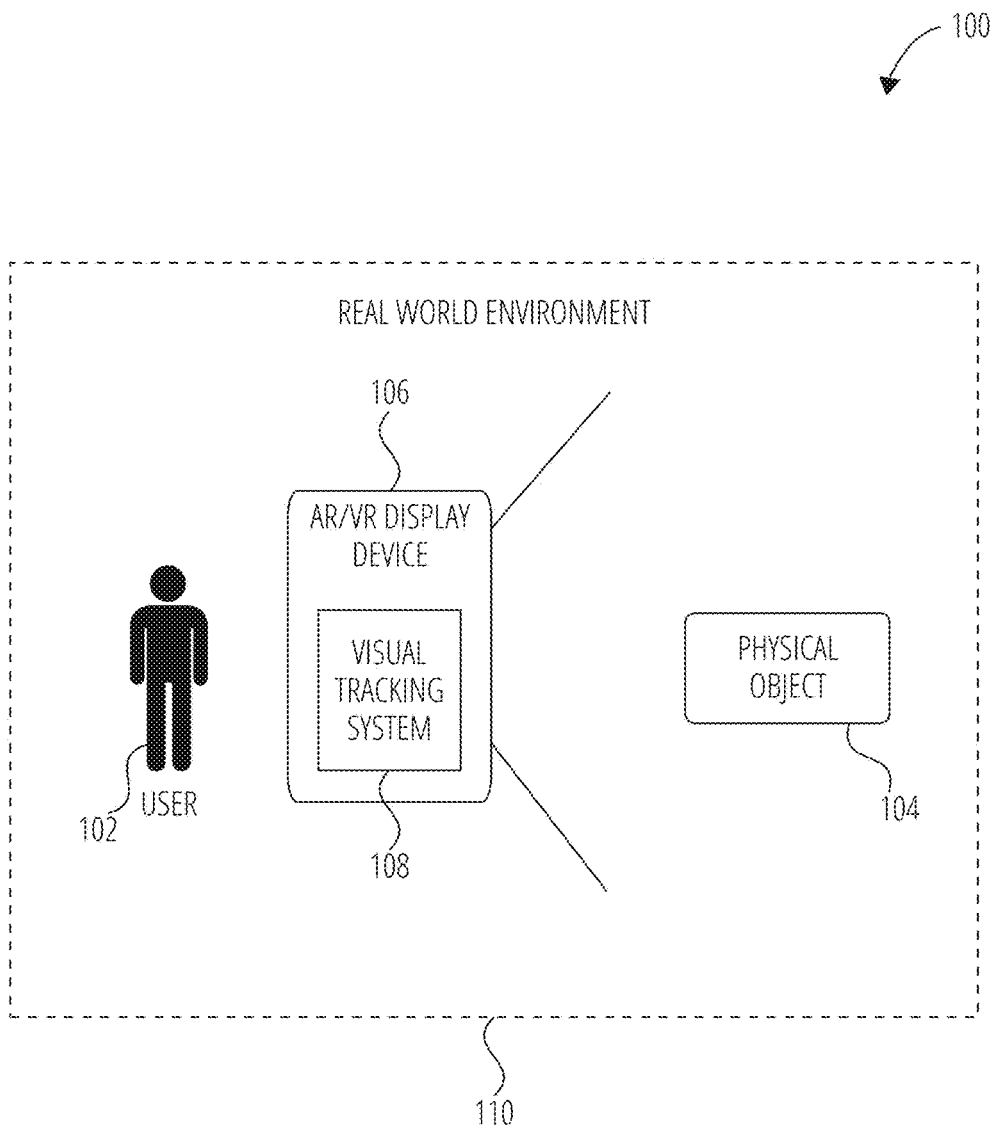
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Inertial Odometry (VIO) system. VSLAM can be used to build a target from an environment, or a scene based on one or more cameras of the visual tracking system. VIO (also referred to as a visual-inertial tracking system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

The term "flexible device" is used herein to refer to a device that is capable of bending without breaking. Non-limiting examples of flexible devices include: head-worn devices such as glasses, flexible display devices such as AR/VR glasses, or any other wearable devices that are capable of bending without breaking to fit a body part of the user.

Both AR and VR applications allow a user to access information, such as in the form of virtual content rendered in a display of an AR/VR display device (also referred to as a display device, flexible device, flexible display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). To do this, the AR display device detects the physical object and tracks a pose of the AR display device relative to the position of the physical object. A pose identifies a position and orientation of the display device relative to a frame of reference or relative to another object. For VR, the virtual object appears at a location based on the pose of the VR display device. The virtual content is therefore refreshed based on the latest pose of the device. A visual tracking system at the display device determines the pose of the display device.

Flexible devices that include a visual tracking system can operate on stereo vision using two cameras that are mounted on the flexible device. For example, one camera is mounted to a left temple of a frame of the flexible device, and another camera is mounted to the right temple of the frame of the flexible device. The flexible device can bend to accommodate different user head sizes. Estimates of the bending can be collected and used to generate biometric data unique to a user wearing the flexible device. In one example, the flexible device learns the head size and bending angle for a particular user of the flexible device.

The bending-based biometric data can then be used to authenticate a person wearing the flexible device. When the flexible device detects that the bending estimate does not match the bending-based biometric data, the flexible device generates an alert notification or generates an authentication procedure (e.g., requests the user to authenticate himself/herself via other means such as entering a username and password or using other biometric data (e.g., voiceprint, iris/retina) obtained from the flexible device.

In one example embodiment, a method for generating reference biometric data based on a bending of a flexible device is described. In one aspect, a method includes forming training data includes bending estimates of a flexible device worn by a first user, training a model based on the training data, and generating reference biometric data for the first user based on the model.

As a result, one or more of the methodologies described herein facilitate solving the technical problem of inaccurate depth sensing from stereo extraction of a flexible device. In other words, the bending of the flexible device causes errors in the depth sensing. The presently described method provides an improvement to an operation of the functioning of a computing device by rectifying the depth map from a flexible stereo-to-depth device that is bent. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 includes a flexible device. In one example, the flexible device includes a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application that generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a visual tracking system 108. The visual tracking system 108 tracks the pose (e.g., position and orientation) of the AR/VR display device 106 relative to the real world environment 110 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. The visual tracking system 108 can include a VIO system. In one example, the AR/VR display device 106 displays virtual content based on the pose of the AR/VR display device 106 relative to the real world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 5 to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
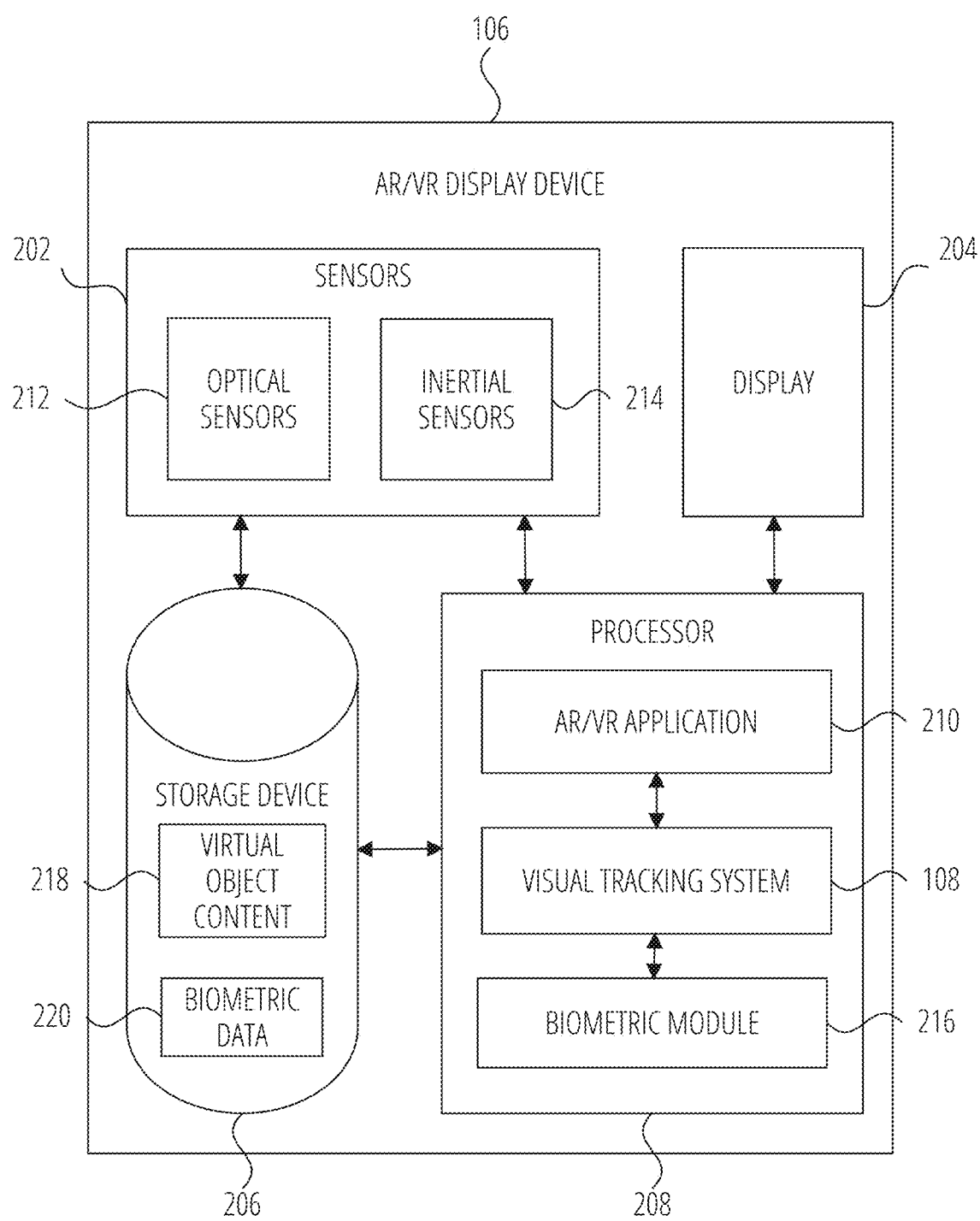
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 208, and a storage device 206. Examples of AR/VR display device 106 include a wearable computing device, a desktop computer, a vehicle computer, a tablet computer, a navigational device, a portable media device, or a smart phone.

The sensors 202 include, for example, an optical sensors 212 (e.g., camera such as a color camera, a thermal camera, a depth sensor and one or multiple grayscale, global shutter tracking cameras) and an inertial sensors 214 (e.g., gyroscope, accelerometer). Other examples of sensors 202 include a proximity or location sensor (e.g., near field communication, GPS, Bluetooth, Wifi), an audio sensor (e.g., a microphone), or any suitable combination thereof. It is noted that the sensors 202 described herein are for illustration purposes and the sensors 202 are thus not limited to the ones described above.

The display 204 includes a screen or monitor configured to display images generated by the processor 208. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 208 includes an AR/VR application 210, a visual tracking system 108, and a biometric module 216. The AR/VR application 210 detects and identifies a physical environment or the physical object 104 using computer vision. The AR/VR application 210 retrieves a virtual object (e.g., 3D object model) based on the identified physical object 104 or physical environment. The AR/VR application 210 renders the virtual object in the display 204. For an AR application, the AR/VR application 210 includes a local rendering engine that generates a visualization of a virtual object overlaid (e.g., superimposed upon, or otherwise displayed in tandem with) on an image of the physical object 104 captured by the optical sensors 212. A visualization of the virtual object may be manipulated by adjusting a position of the physical object 104 (e.g., its physical location, orientation, or both) relative to the optical sensors 212. Similarly, the visualization of the virtual object may be manipulated by adjusting a pose of the AR/VR display device 106 relative to the physical object 104. For a VR application, the AR/VR application 210 displays the virtual object in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensors 212 and the inertial sensors 214 to track a location and pose of the AR/VR display device 106 relative to a frame of reference (e.g., real world environment 110). In one example, the visual tracking system 108 includes a VIO system as previously described above.

The biometric module 216 forms training data based on bending estimates of the AR/VR display device 106 worn by a first user (e.g., user 102). The biometric module 216 trains and generates a model (using machine learning or any other data training technique) based on the training data. The biometric module 216 generates reference biometric data for the first user based on the model. For example, the reference biometric data indicate a range of acceptable bending estimates for user 102. The reference biometric data can then be used to authenticate any user wearing the flexible AR/VR display device 106.

In one example embodiment, the biometric module 216 accesses VIO data from the VIO of the visual tracking system 108 to estimate a pitch-roll bending and a yaw bending. In one example embodiment, the biometric module 216 estimates the bending of flexible AR/VR display device 106 by using VIO stereo matches.

The storage device 206 stores virtual object content 218 and biometric data 220. The biometric data 220 include the reference biometric data of the user 102. The virtual object content 218 includes, for example, a database of visual references (e.g., images) and corresponding experiences (e.g., three-dimensional virtual objects, interactive features of the three-dimensional virtual objects).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
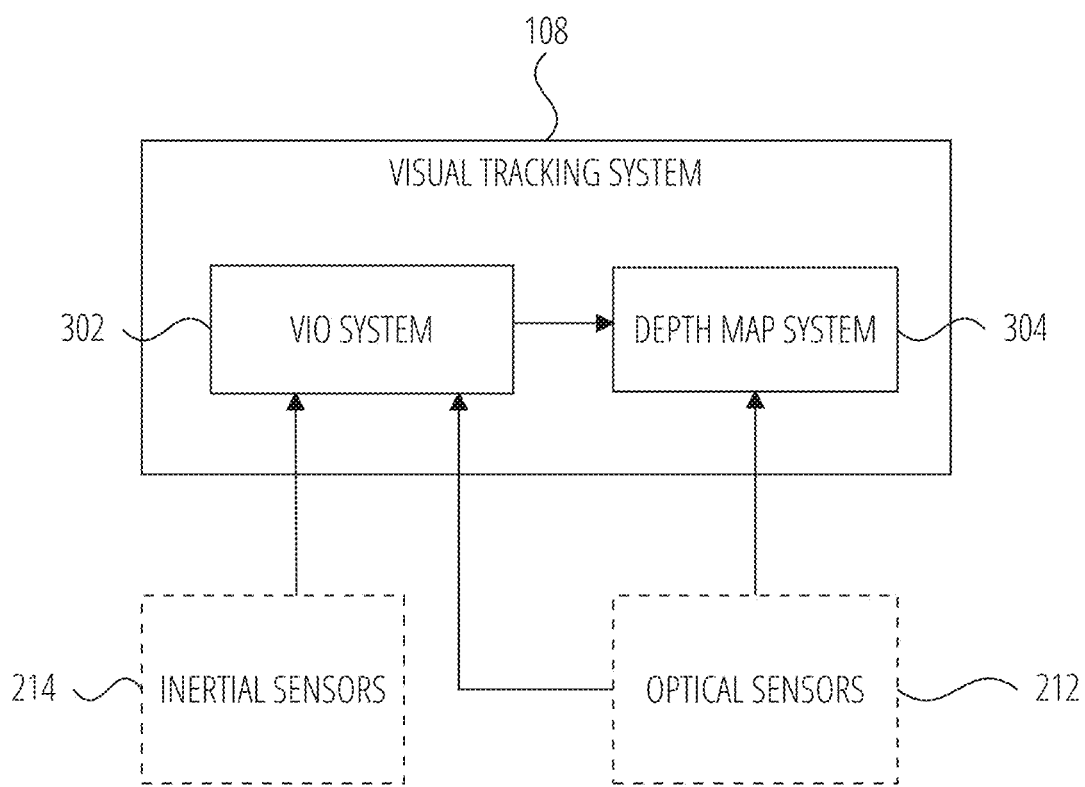
FIG. 3 is a block diagram illustrating a visual tracking system in accordance with one example embodiment.

FIG. 3 illustrates the visual tracking system 108 in accordance with one example embodiment. The visual tracking system 108 includes, for example, a VIO system 302 and a depth map system 304. The VIO system 302 accesses inertial sensor data from the inertial sensors 214 and images from the optical sensors 212.

The VIO system 302 determines a pose (e.g., location, position, orientation) of the AR/VR display device 106 relative to a frame of reference (e.g., real world environment 110). In one example embodiment, the VIO system 302 estimates the pose of the AR/VR display device 106 based on 3D maps of feature points from images captured with the optical sensors 212 and the inertial sensor data captured with the inertial sensors 214.

The depth map system 304 accesses image data from the optical sensors 212 and generates a depth map based on the VIO data (e.g., feature points depth) from the VIO system 302. For example, the depth map system 304 generates a depth map based on the depth of matched features between a left image (generated by a left side camera) and a right image (generated by a right side camera). In another example, the depth map system 304 is based on triangulation of element disparities in the stereo images.

Figure 4:
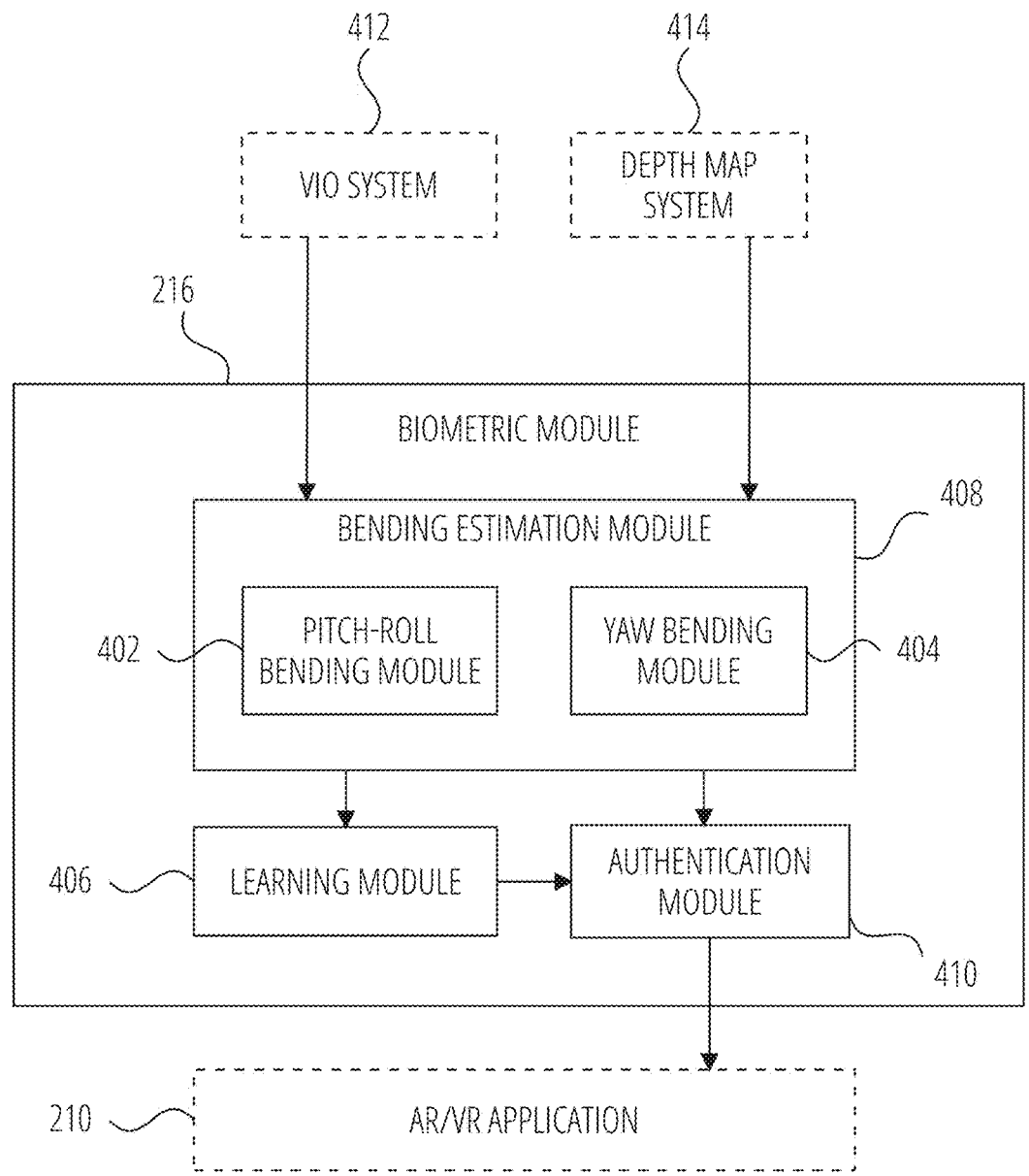
FIG. 4 is a block diagram illustrating a biometric module in accordance with one example embodiment.

FIG. 4 is a block diagram illustrating a biometric module 216 in accordance with one example embodiment. The biometric module 216 includes a bending estimation module 408, a learning module 406, and an authentication module 410.

The bending estimation module 408 estimates bending of the AR/VR display device 106 when worn by a user. For example, the bending estimation module 408 estimates the bending over a period of time (e.g., every minute) when the user wears the AR/VR display device 106. In another example, the bending estimation module 408 estimates the bending of the AR/VR display device 106 every time the user 102 wears the AR/VR display device 106. In one example, the bending estimation module 408 accesses VIO data from VIO system 412 and depth data from depth map system 414 to estimate the bending.

The bending estimation module 408 includes a pitch-roll bending module 402 and a yaw bending module 404. The pitch-roll bending module 402 determines a bending that results in a pitch or roll deviation of the AR/VR display device 106. The yaw bending module 404 determines a bending that results in a yaw deviation of the AR/VR display device 106. In one example, the yaw bending module 404 estimates the yaw deviation by accessing 3D landmarks determined by the VIO system 412 to obtain a wide baseline with temporal consistency.

The learning module 406 receives the bending estimates from the bending estimation module 408 for the user 102 and forms training data based on the bending estimates. The learning module 406 uses a machine learning component (not shown) to train and generate a model based on the training data. The model identifies acceptable ranges of the bending based on other parameters (e.g., user wearing at night, outdoor, after a period of time, etc. . . . ). In one example, the model generates a reference biometric model based on the training data.

The authentication module 410 detects a wearing of the AR/VR display device 106 by a new user. For example, the authentication module 410 detects that the AR/VR display device 106 is turned on and worn by the new user. This detection triggers the bending estimation module 408 to estimate a bending of the AR/VR display device 106. The authentication module 410 receives a new bending estimate from the bending estimation module 408. The authentication module 410 compares the new bending estimate with the reference biometric data (associated with user 102) to authenticate the new user. For example, the authentication module 410 determines that the bending estimate from the new user is within the acceptable bending range of the reference biometric data of the user 102. The authentication module 410 issues a command to the AR/VR application 210 on whether to grant or deny access (of the AR application account of the user 102) to the new user based on the authentication.

Figure 5:
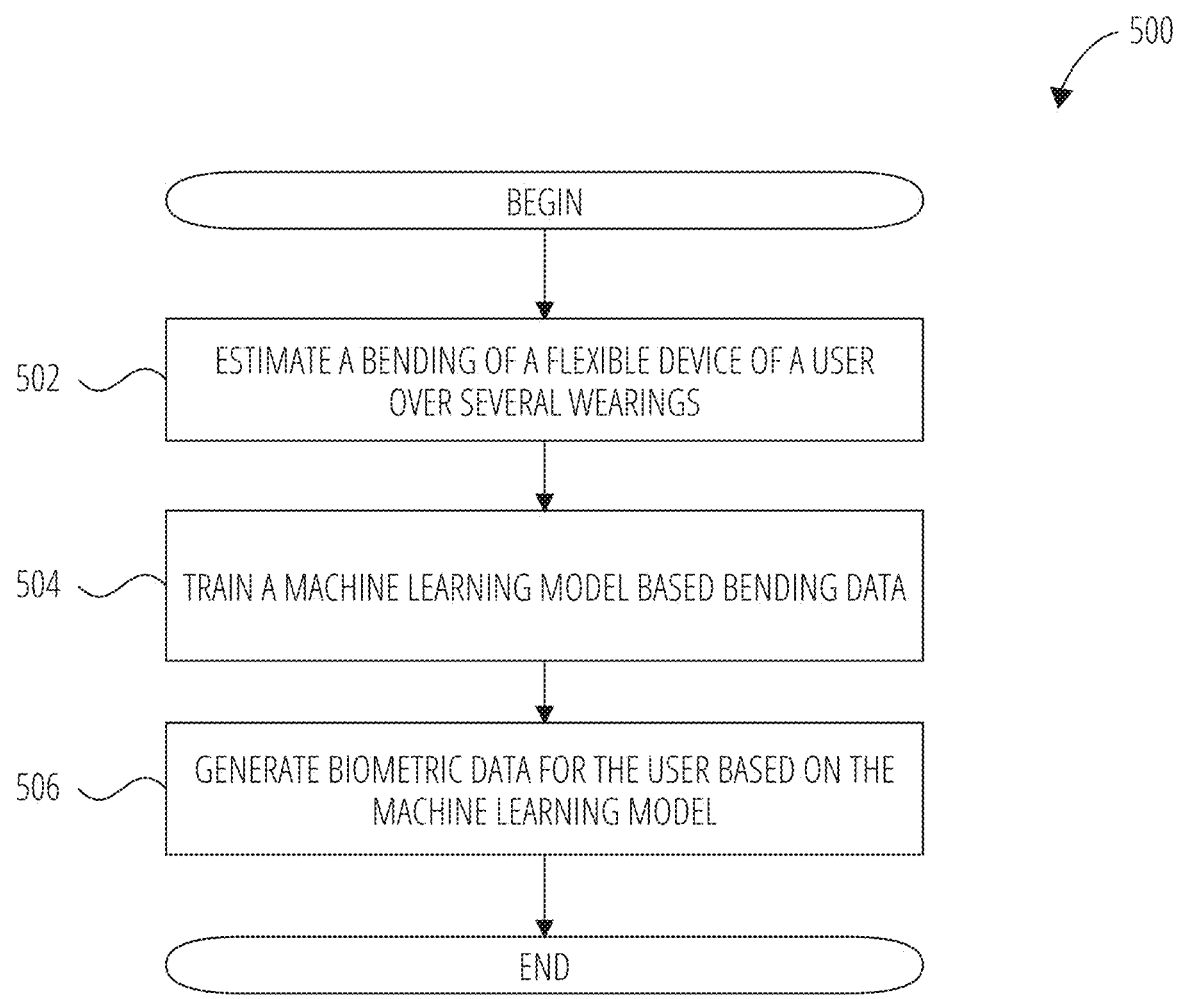
FIG. 5 is a flow diagram illustrating a method for generating biometric data in accordance with one example embodiment.

FIG. 5 is a flow diagram illustrating a method 500 for generating biometric data in accordance with one example embodiment. Operations in the method 500 may be performed by the AR/VR display device 106, using components (e.g., modules, engines) described above with respect to FIG. 2. Accordingly, the method 500 is described by way of example with reference to the AR/VR display device 106. However, it shall be appreciated that at least some of the operations of the method 500 may be deployed on various other hardware configurations or be performed by similar components residing elsewhere.

In block 502, the AR/VR display device 106 estimates a bending of a flexible device of a user over several wears. In block 504, the AR/VR display device 106 trains a machine learning model based bending data. In block 506, the AR/VR display device 106 generates biometric data for the user based on the machine learning model.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 6:
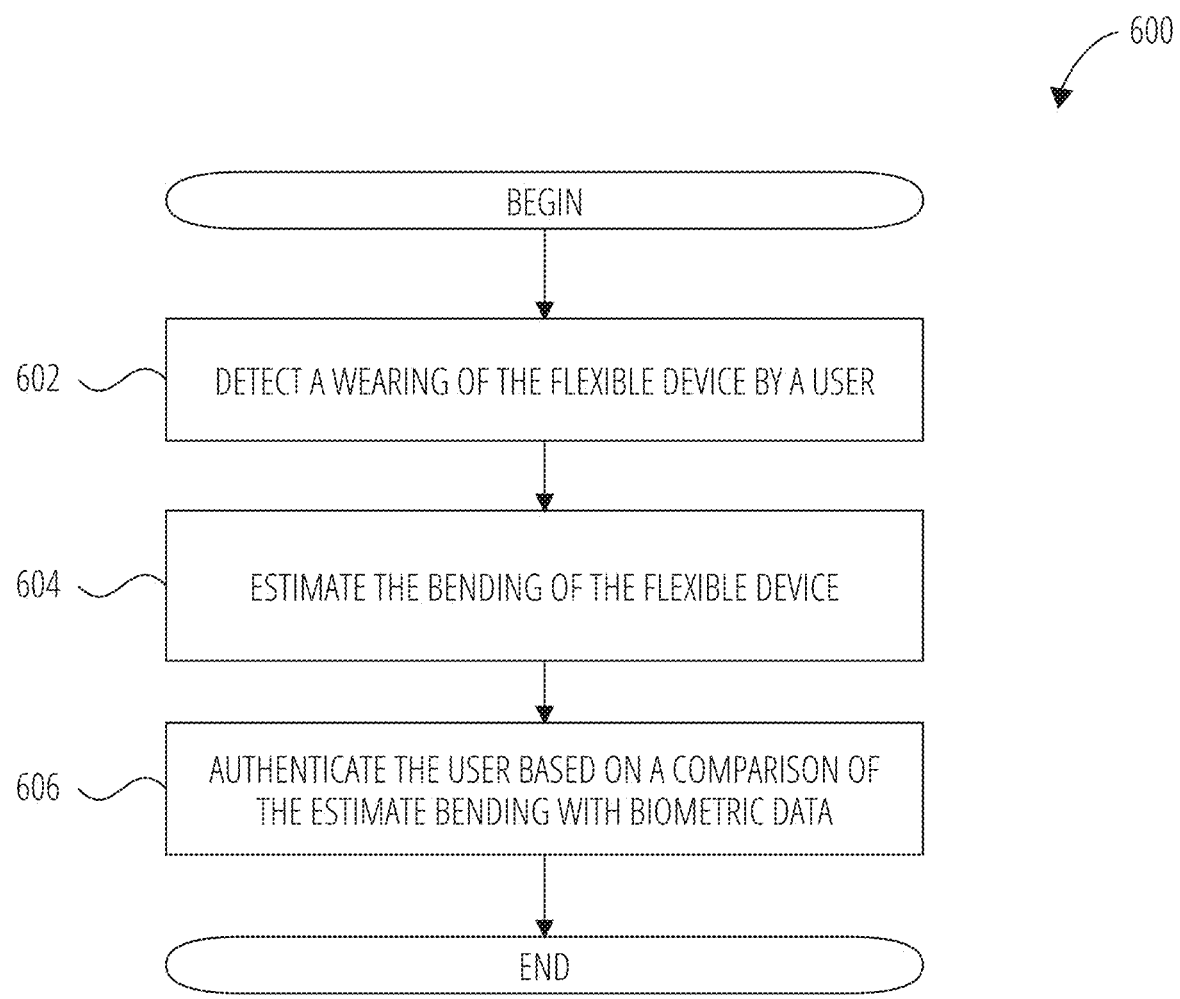
FIG. 6 is a flow diagram illustrating a method for authenticating a user in accordance with one example embodiment.

FIG. 6 is a flow diagram illustrating a method for authenticating a user in accordance with one example embodiment. Operations in the method 600 may be performed by the AR/VR display device 106, using components (e.g., modules, engines) described above with respect to FIG. 1. Accordingly, the method 600 is described by way of example with reference to the AR/VR display device 106. However, it shall be appreciated that at least some of the operations of the method 600 may be deployed on various other hardware configurations or be performed by similar components residing elsewhere.

In block 602, the AR/VR display device 106 detects a wearing of the flexible device by a user. In block 604, the AR/VR display device 106 estimates the bending of the flexible device. In block 606, the AR/VR display device 106 authenticates the user based on a comparison of the estimate bending with biometric data.

Figure 7:
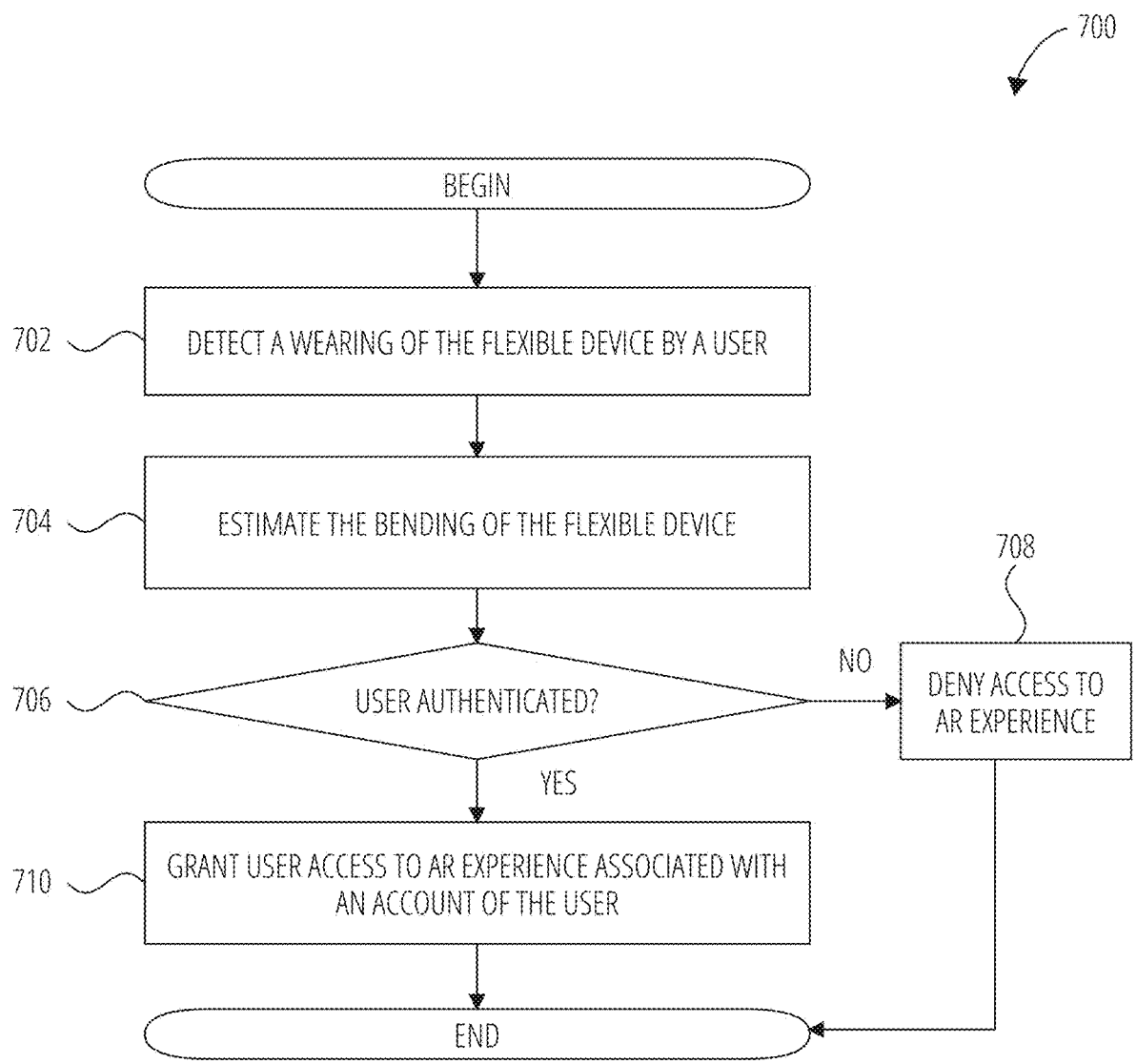
FIG. 7 is a flow diagram illustrating a method for authenticating a user in accordance with one example embodiment.

FIG. 7 is a flow diagram illustrating a method for authenticating a user in accordance with one example embodiment. Operations in the method 700 may be performed by the AR/VR display device 106, using components (e.g., modules, engines) described above with respect to FIG. 2. Accordingly, the method 700 is described by way of example with reference to the AR/VR display device 106. However, it shall be appreciated that at least some of the operations of the method 700 may be deployed on various other hardware configurations or be performed by similar components residing elsewhere.

In block 702, the AR/VR display device 106 detects a wearing of the flexible device by a user. In block 704, the AR/VR display device 106 estimates the bending of the flexible device. In decision block 706, the AR/VR display device 106 determines whether the user is authenticated. In block 708, the AR/VR display device 106 denies the user access to the AR experience (associated with an account of the user 102). In block 710, the AR/VR display device 106 grants the user access to the AR experience associated with an account of the user 102.

Figure 8:
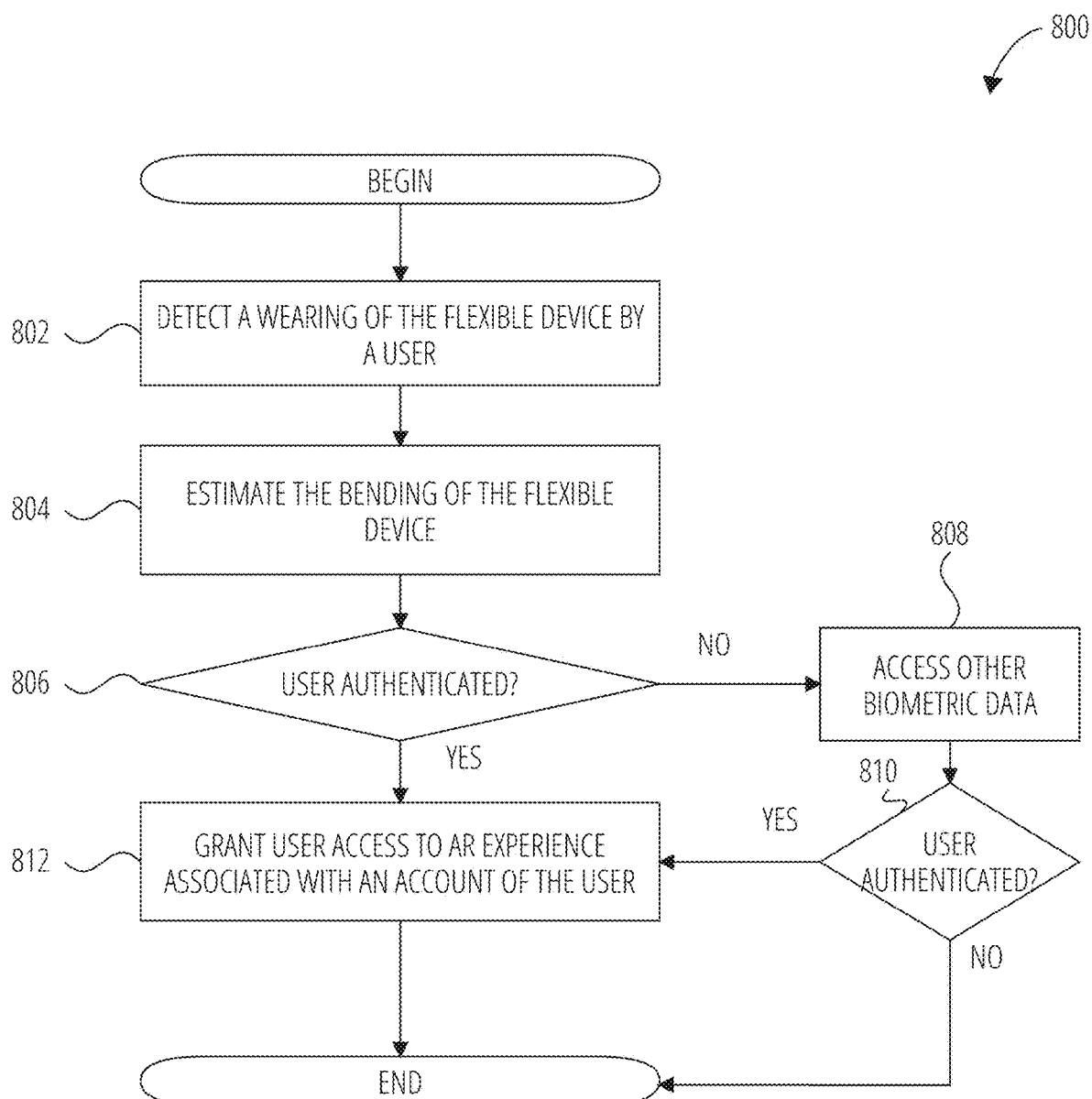
FIG. 8 is a flow diagram illustrating a method for authenticating a user in accordance with one example embodiment.

FIG. 8 is a flow diagram illustrating a method for authenticating a user in accordance with one example embodiment. Operations in the method 800 may be performed by the AR/VR display device 106, using components (e.g., modules, engines) described above with respect to FIG. 2. Accordingly, the method 800 is described by way of example with reference to the AR/VR display device 106. However, it shall be appreciated that at least some of the operations of the method 800 may be deployed on various other hardware configurations or be performed by similar components residing elsewhere.

In block 802, the AR/VR display device 106 detects a wearing of the flexible device by a new user. In block 804, the AR/VR display device 106 estimates the bending of the flexible device. In decision block 806, the AR/VR display device 106 determines whether the new user is authenticated. In block 808, the AR/VR display device 106 accesses other biometric data (of the new user wearing the AR/VR display device 106). In decision block 810, the AR/VR display device 106 determines whether the new user is authenticated. In block 812, the AR/VR display device 106 grants the new user access to the AR experience associated with an account of the user 102.

Figure 9:
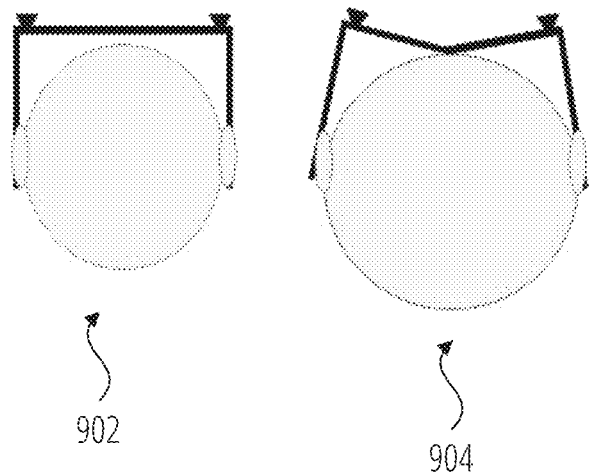
FIG. 9 illustrates bending of a flexible device on different head sizes in accordance with one embodiment.

FIG. 9 illustrates bending of a flexible device on different head sizes (head size 902 and head size 904) in accordance with one embodiment. In head size 904, the flexible device is bent causing a yaw angle bias.

Figure 10:
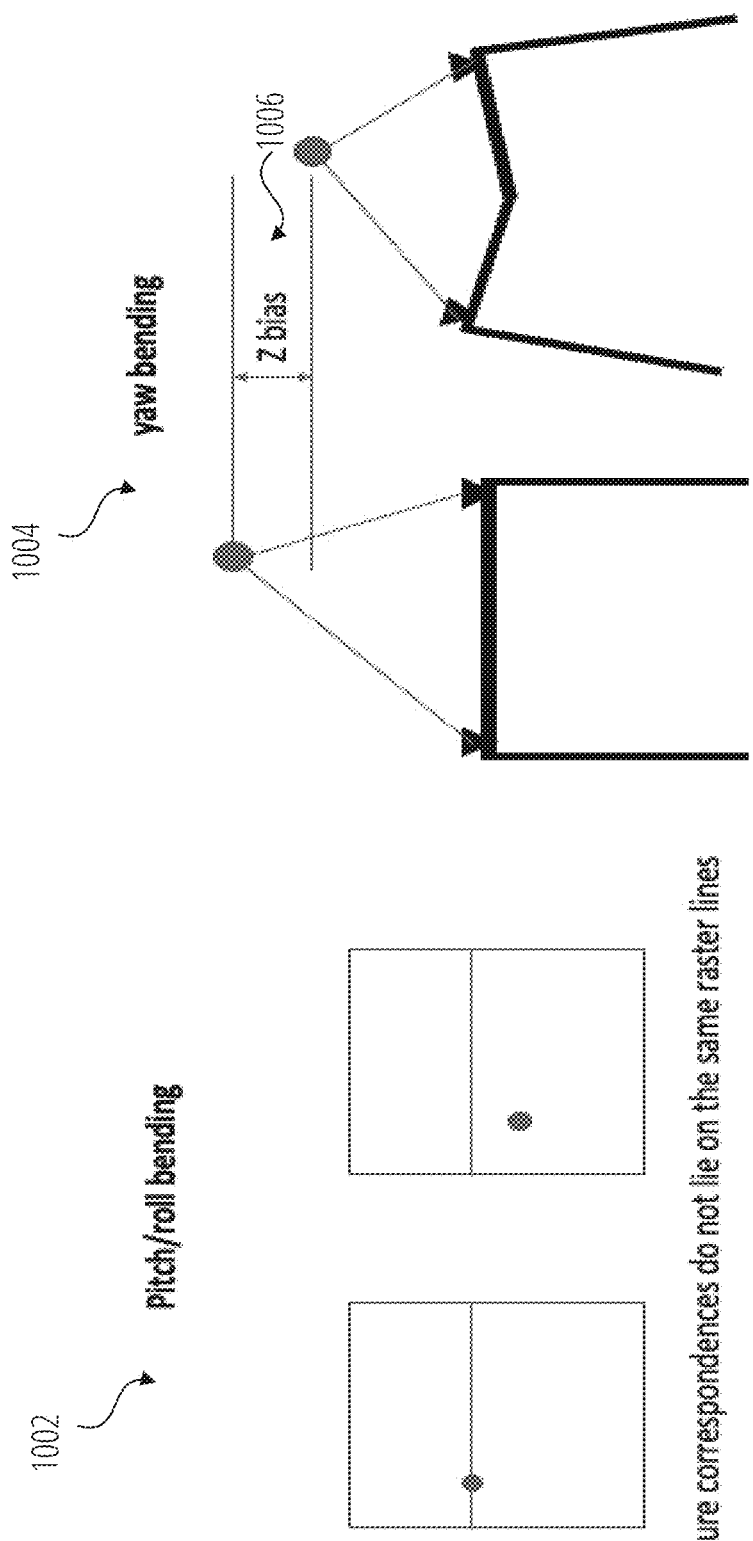
FIG. 10 illustrates misalignment errors resulting from bending of a flexible device in accordance with one embodiment.

FIG. 10 illustrates misalignment errors resulting from bending of a flexible device in accordance with one embodiment. Example 1002 illustrates feature correspondences that do not lie on the same raster lines due to pitch/roll bending. Example 1004 illustrates z bias 1006 due to yaw bending.

Figure 11:
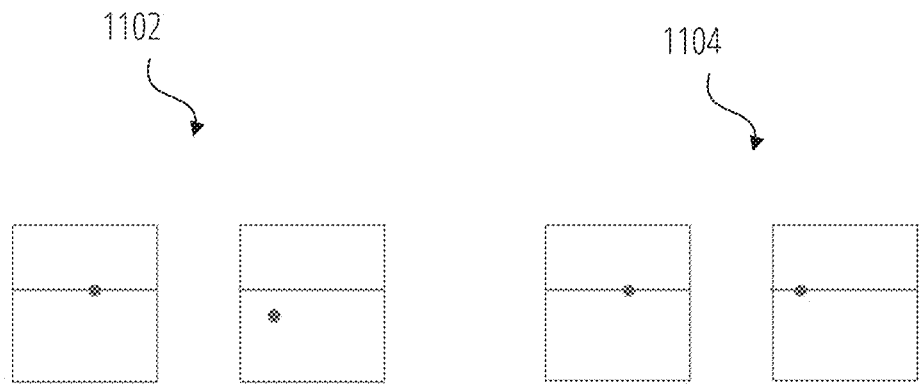
FIG. 11 illustrates a pitch-roll misalignment in accordance with one embodiment.

FIG. 11 illustrates a pitch-roll misalignment in accordance with one embodiment. Example 1102 illustrates corresponding features (between a left side and a right side) that do not lie on the same raster line due to bending. Example 1104 illustrates corresponding features that lie on the same raster line.

Figure 12:
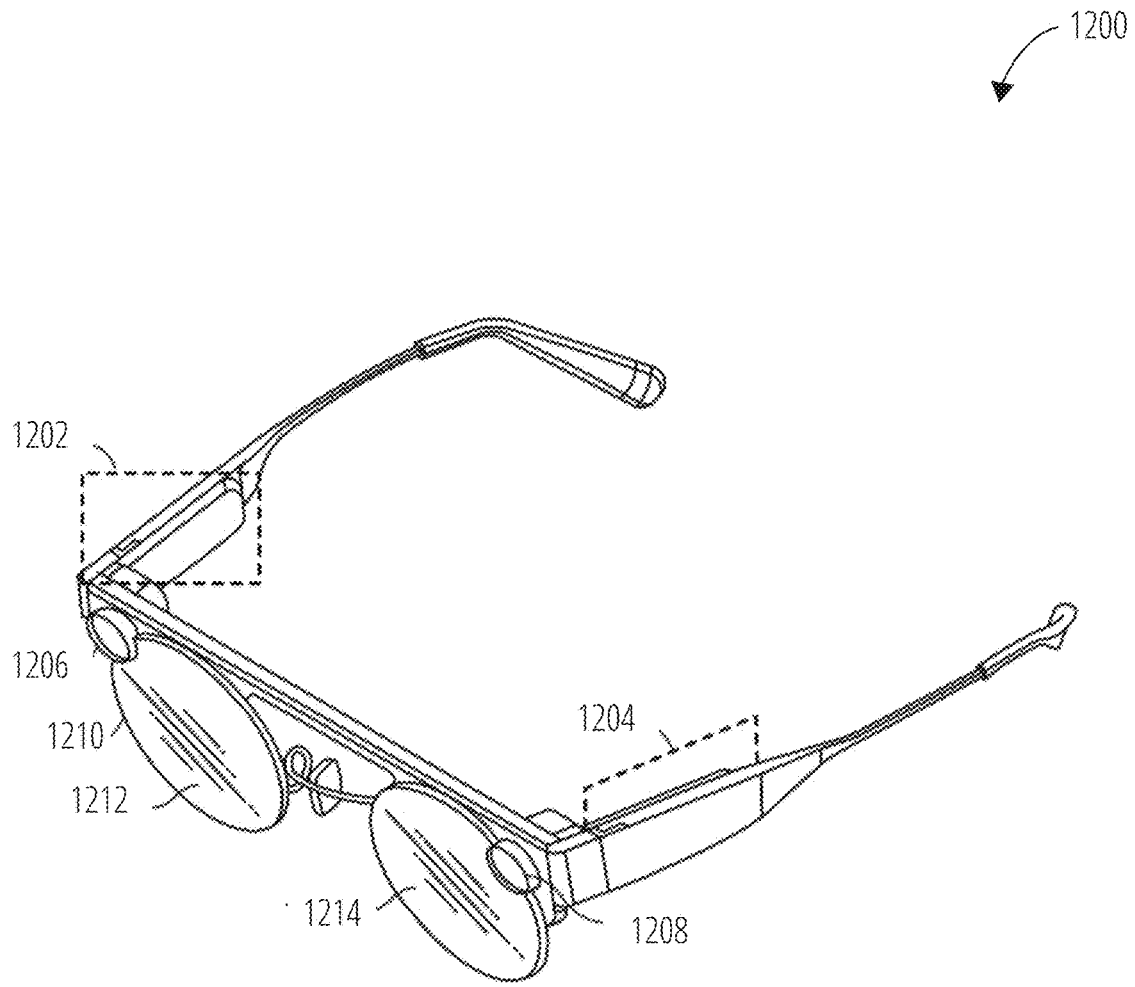
FIG. 12 illustrates a head-wearable device, according to one example embodiment.

FIG. 12 illustrates a head-wearable apparatus 1200, according to one example embodiment. FIG. 12 illustrates a perspective view of the head-wearable apparatus 1200 according to one example embodiment. In some examples, the AR/VR display device 106 may be the head-wearable apparatus 1200.

In FIG. 12, the head-wearable apparatus 1200 is a pair of eyeglasses. In some embodiments, the head-wearable apparatus 1200 can be sunglasses or goggles. Some embodiments can include one or more wearable devices, such as a pendant with an integrated camera that is integrated with, in communication with, or coupled to, the head-wearable apparatus 1200 or an AR/VR display device 106. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus 1200 can be included in an AR/VR display device 106 that can be used in conjunction with the head-wearable apparatus 1200.

In FIG. 12, the head-wearable apparatus 1200 is a pair of eyeglasses that includes a frame 1210 that includes eye wires (or rims) that are coupled to two stems (or temples), respectively, via hinges and/or end pieces. The eye wires of the frame 1210 carry or hold a pair of lenses (e.g., lens 1212 and lens 1214). The frame 1210 includes a first (e.g., right) side that is coupled to the first stem and a second (e.g., left) side that is coupled to the second stem. The first side is opposite the second side of the frame 1210.

The head-wearable apparatus 1200 further includes a camera module (not shown) that includes camera lenses (e.g., camera lens 1206, camera lens 1208) and at least one image sensor. The camera lens 1206 and camera lens 1208 may be a perspective camera lens or a non-perspective camera lens. A non-perspective camera lens may be, for example, a fisheye lens, a wide-angle lens, an omnidirectional lens, etc. The image sensor captures digital video through the camera lens 1206 and camera lens 1208. The images may include still image frames or a video including a plurality of still image frames. The camera module can be coupled to the frame 1210. As shown in FIG. 12, the frame 1210 is coupled to the camera lens 1206 and camera lens 1208 such that the camera lenses (e.g., camera lens 1206, camera lens 1208) face forward. The camera lens 1206 and camera lens 1208 can be perpendicular to the lens 1212 and lens 1214. The camera module can include dual-front facing cameras that are separated by the width of the frame 1210 or the width of the head of the user of the head-wearable apparatus 1200.

In FIG. 12, the two stems (or temples) are respectively coupled to microphone housing 1202 and microphone housing 1204. The first and second stems are coupled to opposite sides of a frame 1210 of the head-wearable apparatus 1200. The first stem is coupled to the first microphone housing 1202 and the second stem is coupled to the second microphone housing 1204. The microphone housing 1202 and microphone housing 1204 can be coupled to the stems between the locations of the frame 1210 and the temple tips. The microphone housing 1202 and microphone housing 1204 can be located on either side of the user's temples when the user is wearing the head-wearable apparatus 1200.

As shown in FIG. 12, the microphone housing 1202 and microphone housing 1204 encase a plurality of microphones (not shown). The microphones are air interface sound pickup devices that convert sound into an electrical signal. More specifically, the microphones are transducers that convert acoustic pressure into electrical signals (e.g., acoustic signals). Microphones can be digital or analog microelectromechanical systems (MEMS) microphones. The acoustic signals generated by the microphones can be pulse density modulation (PDM) signals.

System with Head-Wearable Apparatus

Figure 13:
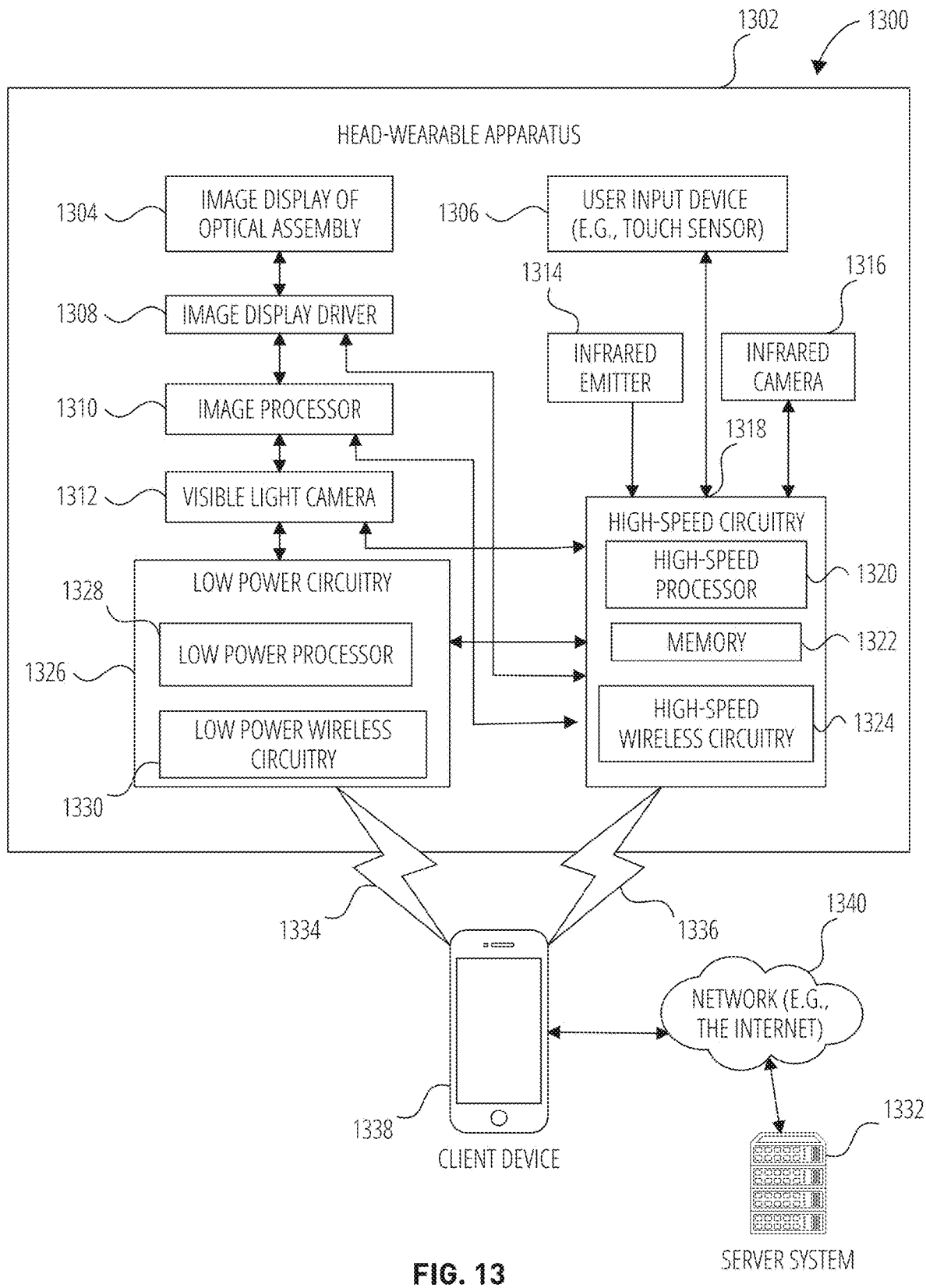
FIG. 13 illustrates a network environment in which a head-wearable device can be implemented according to one example embodiment.

FIG. 13 illustrates a network environment 1300 in which the head-wearable apparatus 1302 can be implemented according to one example embodiment. FIG. 13 is a high-level functional block diagram of an example head-wearable apparatus 1302 communicatively coupled a mobile client device 1338 and a server system 1332 via various network 1340.

head-wearable apparatus 1302 includes a camera, such as at least one of visible light camera 1312, infrared emitter 1314 and infrared camera 1316. The client device 1338 can be capable of connecting with head-wearable apparatus 1302 using both a communication 1334 and a communication 1336. client device 1338 is connected to server system 1332 and network 1340. The network 1340 may include any combination of wired and wireless connections.

The head-wearable apparatus 1302 further includes two image displays of the image display of optical assembly 1304. The two include one associated with the left lateral side and one associated with the right lateral side of the head-wearable apparatus 1302. The head-wearable apparatus 1302 also includes image display driver 1308, image processor 1310, low-power low power circuitry 1326, and high-speed circuitry 1318. The image display of optical assembly 1304 are for presenting images and videos, including an image that can include a graphical user interface to a user of the head-wearable apparatus 1302.

The image display driver 1308 commands and controls the image display of the image display of optical assembly 1304. The image display driver 1308 may deliver image data directly to the image display of the image display of optical assembly 1304 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1302 includes a frame and stems (or temples) extending from a lateral side of the frame. The head-wearable apparatus 1302 further includes a user input device 1306 (e.g., touch sensor or push button) including an input surface on the head-wearable apparatus 1302. The user input device 1306 (e.g., touch sensor or push button) is to receive from the user an input selection to manipulate the graphical user interface of the presented image.

The components shown in FIG. 13 for the head-wearable apparatus 1302 are located on one or more circuit boards, for example a PCB or flexible PCB, in the rims or temples. Alternatively, or additionally, the depicted components can be located in the chunks, frames, hinges, or bridge of the head-wearable apparatus 1302. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1302 includes a memory 1322 which stores instructions to perform a subset or all of the functions described herein. memory 1322 can also include storage device.

As shown in FIG. 13, high-speed circuitry 1318 includes high-speed processor 1320, memory 1322, and high-speed wireless circuitry 1324. In the example, the image display driver 1308 is coupled to the high-speed circuitry 1318 and operated by the high-speed processor 1320 in order to drive the left and right image displays of the image display of optical assembly 1304. high-speed processor 1320 may be any processor capable of managing high-speed communications and operation of any general computing system needed for head-wearable apparatus 1302. The high-speed processor 1320 includes processing resources needed for managing high-speed data transfers on communication 1336 to a wireless local area network (WLAN) using high-speed wireless circuitry 1324. In certain examples, the high-speed processor 1320 executes an operating system such as a LINUX operating system or other such operating system of the head-wearable apparatus 1302 and the operating system is stored in memory 1322 for execution. In addition to any other responsibilities, the high-speed processor 1320 executing a software architecture for the head-wearable apparatus 1302 is used to manage data transfers with high-speed wireless circuitry 1324. In certain examples, high-speed wireless circuitry 1324 is configured to implement Institute of Electrical and Electronic Engineers (IEEE) 802.11 communication standards, also referred to herein as Wi-Fi. In other examples, other high-speed communications standards may be implemented by high-speed wireless circuitry 1324.

The low power wireless circuitry 1330 and the high-speed wireless circuitry 1324 of the head-wearable apparatus 1302 can include short range transceivers (Bluetooth™) and wireless wide, local, or wide area network transceivers (e.g., cellular or WiFi). The client device 1338, including the transceivers communicating via the communication 1334 and communication 1336, may be implemented using details of the architecture of the head-wearable apparatus 1302, as can other elements of network 1340.

The memory 1322 includes any storage device capable of storing various data and applications, including, among other things, camera data generated by the left and right, infrared camera 1316, and the image processor 1310, as well as images generated for display by the image display driver 1308 on the image displays of the image display of optical assembly 1304. While memory 1322 is shown as integrated with high-speed circuitry 1318, in other examples, memory 1322 may be an independent standalone element of the head-wearable apparatus 1302. In certain such examples, electrical routing lines may provide a connection through a chip that includes the high-speed processor 1320 from the image processor 1310 or low power processor 1328 to the memory 1322. In other examples, the high-speed processor 1320 may manage addressing of memory 1322 such that the low power processor 1328 will boot the high-speed processor 1320 any time that a read or write operation involving memory 1322 is needed.

As shown in FIG. 13, the low power processor 1328 or high-speed processor 1320 of the head-wearable apparatus 1302 can be coupled to the camera (visible light camera 1312; infrared emitter 1314, or infrared camera 1316), the image display driver 1308, the user input device 1306 (e.g., touch sensor or push button), and the memory 1322.

The head-wearable apparatus 1302 is connected with a host computer. For example, the head-wearable apparatus 1302 is paired with the client device 1338 via the communication 1336 or connected to the server system 1332 via the network 1340. server system 1332 may be one or more computing devices as part of a service or network computing system, for example, that include a processor, a memory, and network communication interface to communicate over the network 1340 with the client device 1338 and head-wearable apparatus 1302.

The client device 1338 includes a processor and a network communication interface coupled to the processor. The network communication interface allows for communication over the network 1340, communication 1334 or communication 1336. client device 1338 can further store at least portions of the instructions for generating a binaural audio content in the client device 1338's memory to implement the functionality described herein.

Output components of the head-wearable apparatus 1302 include visual components, such as a display such as a liquid crystal display (LCD), a plasma display panel (PDP), a light emitting diode (LED) display, a projector, or a waveguide. The image displays of the optical assembly are driven by the image display driver 1308. The output components of the head-wearable apparatus 1302 further include acoustic components (e.g., speakers), haptic components (e.g., a vibratory motor), other signal generators, and so forth. The input components of the head-wearable apparatus 1302, the client device 1338, and server system 1332, such as the user input device 1306, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1302 may optionally include additional peripheral device elements. Such peripheral device elements may include biometric sensors, additional sensors, or display elements integrated with head-wearable apparatus 1302. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1336 from the client device 1338 via the low power wireless circuitry 1330 or high-speed wireless circuitry 1324.

Figure 14:
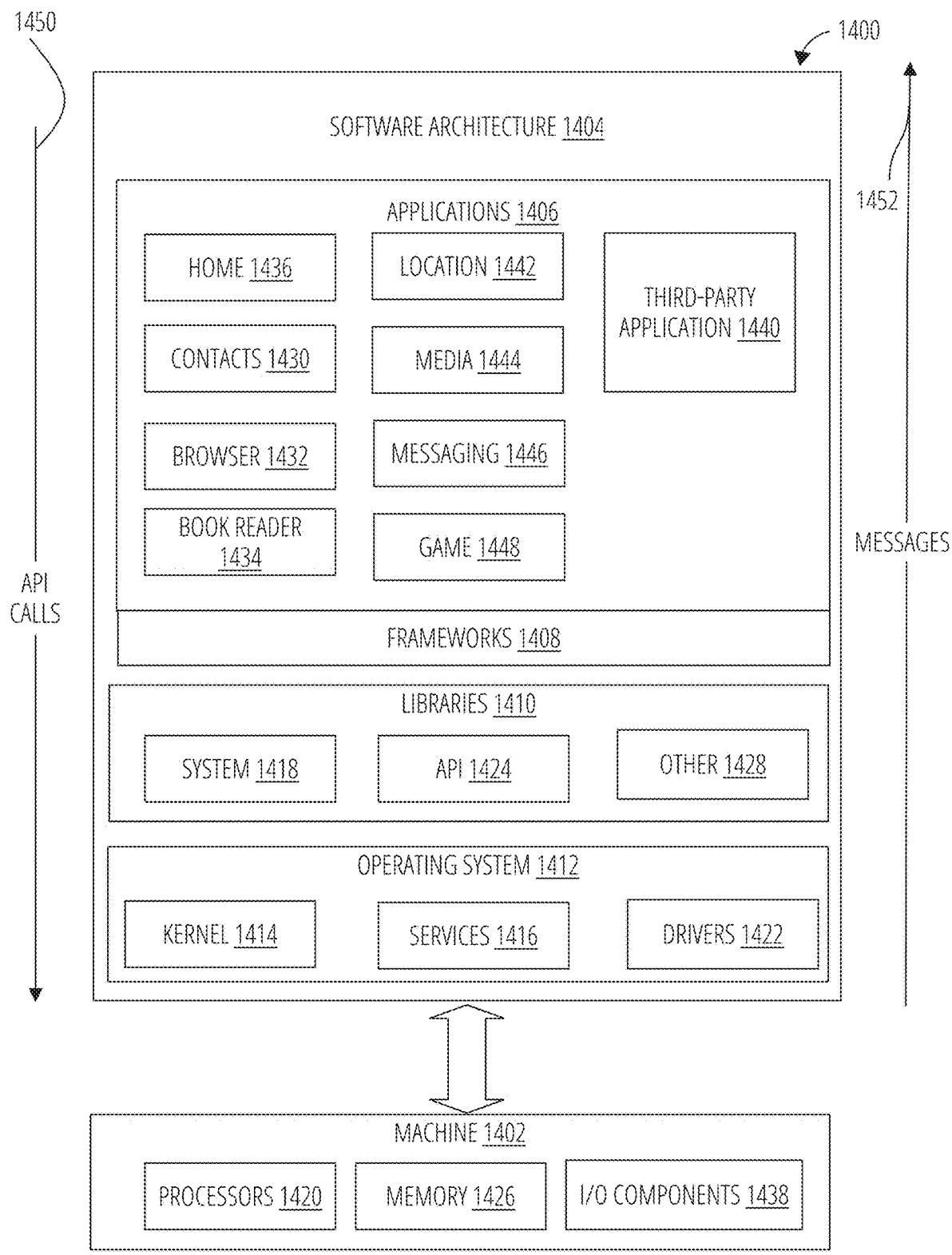
FIG. 14 is block diagram showing a software architecture within which the present disclosure may be implemented, according to an example embodiment.

FIG. 14 is a block diagram 1400 illustrating a software architecture 1404, which can be installed on any one or more of the devices described herein. The software architecture 1404 is supported by hardware such as a machine 1402 that includes Processors 1420, memory 1426, and I/O Components 1438. In this example, the software architecture 1404 can be conceptualized as a stack of layers, where each layer provides a particular functionality. The software architecture 1404 includes layers such as an operating system 1412, libraries 1410, frameworks 1408, and applications 1406. Operationally, the applications 1406 invoke API calls 1450 through the software stack and receive messages 1452 in response to the API calls 1450.

The operating system 1412 manages hardware resources and provides common services. The operating system 1412 includes, for example, a kernel 1414, services 1416, and drivers 1422. The kernel 1414 acts as an abstraction layer between the hardware and the other software layers. For example, the kernel 1414 provides memory management, Processor management (e.g., scheduling), Component management, networking, and security settings, among other functionality. The services 1416 can provide other common services for the other software layers. The drivers 1422 are responsible for controlling or interfacing with the underlying hardware. For instance, the drivers 1422 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1410 provide a low-level common infrastructure used by the applications 1406. The libraries 1410 can include system libraries 1418 (e.g., C standard library) that provide functions such as memory allocation functions, string manipulation functions, mathematic functions, and the like. In addition, the libraries 1410 can include API libraries 1424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1410 can also include a wide variety of other libraries 1428 to provide many other APIs to the applications 1406.

The frameworks 1408 provide a high-level common infrastructure that is used by the applications 1406. For example, the frameworks 1408 provide various graphical user interface (GUI) functions, high-level resource management, and high-level location services. The frameworks 1408 can provide a broad spectrum of other APIs that can be used by the applications 1406, some of which may be specific to a particular operating system or platform.

In an example embodiment, the applications 1406 may include a home application 1436, a contacts application 1430, a browser application 1432, a book reader application 1434, a location application 1442, a media application 1444, a messaging application 1446, a game application 1448, and a broad assortment of other applications such as a third-party application 1440. The applications 1406 are programs that execute functions defined in the programs. Various programming languages can be employed to create one or more of the applications 1406, structured in a variety of manners, such as object-oriented programming languages (e.g., Objective-C, Java, or C++) or procedural programming languages (e.g., C or assembly language). In a specific example, the third-party application 1440 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1440 can invoke the API calls 1450 provided by the operating system 1412 to facilitate functionality described herein.

Figure 15:
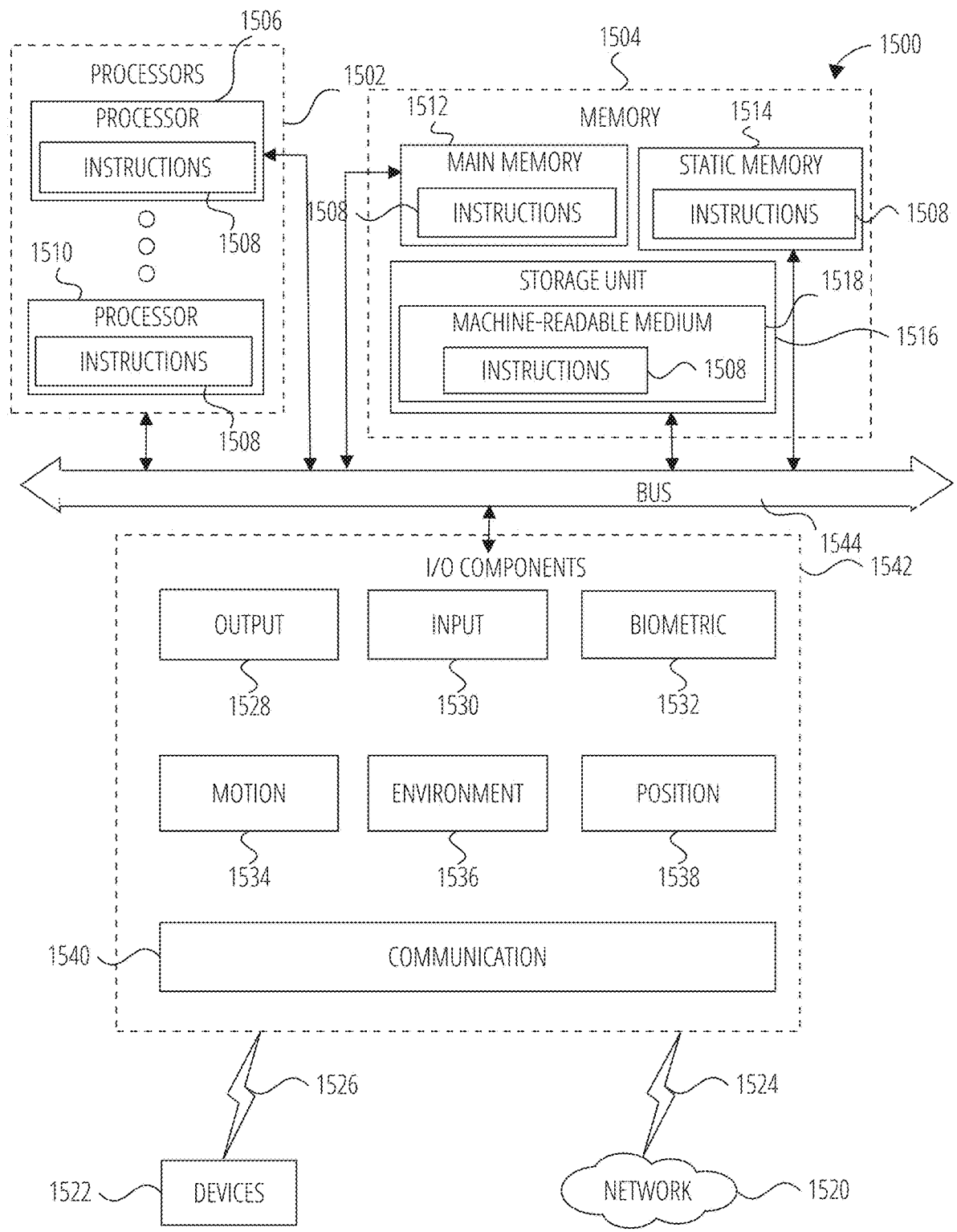
FIG. 15 is a diagrammatic representation of a machine in the form of a computer system within which a set of instructions may be executed for causing the machine to perform any one or more of the methodologies discussed herein, according to one example embodiment.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein.

The machine 1500 may include Processors 1502, memory 1504, and I/O Components 1542, which may be configured to communicate with each other via a bus 1544. In an example embodiment, the Processors 1502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1506 and a Processor 1510 that execute the instructions 1508. The term "Processor" is intended to include multi-core Processors that may comprise two or more independent Processors (sometimes referred to as "cores") that may execute instructions contemporaneously. Although FIG. 15 shows multiple Processors 1502, the machine 1500 may include a single Processor with a single core, a single Processor with multiple cores (e.g., a multi-core Processor), multiple Processors with a single core, multiple Processors with multiples cores, or any combination thereof.

The memory 1504 includes a main memory 1512, a static memory 1514, and a storage unit 1516, both accessible to the Processors 1502 via the bus 1544. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within machine-readable medium 1518 within the storage unit 1516, within at least one of the Processors 1502 (e.g., within the Processor's cache memory), or any suitable combination thereof, during execution thereof by the machine 1500.

The I/O Components 1542 may include a wide variety of Components to receive input, provide output, produce output, transmit information, exchange information, capture measurements, and so on. The specific I/O Components 1542 that are included in a particular machine will depend on the type of machine. For example, portable machines such as mobile phones may include a touch input device or other such input mechanisms, while a headless server machine will likely not include such a touch input device. It will be appreciated that the I/O Components 1542 may include many other Components that are not shown in FIG. 15. In various example embodiments, the I/O Components 1542 may include output Components 1528 and input Components 1530. The output Components 1528 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1530 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1542 may include biometric Components 1532, motion Components 1534, environmental Components 1536, or position Components 1538, among a wide array of other Components. For example, the biometric Components 1532 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1534 include acceleration sensor Components (e.g., accelerometer), gravitation sensor Components, rotation sensor Components (e.g., gyroscope), and so forth. The environmental Components 1536 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1538 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1542 further include communication Components 1540 operable to couple the machine 1500 to a network 1520 or devices 1522 via a coupling 1524 and a coupling 1526, respectively. For example, the communication Components 1540 may include a network interface Component or another suitable device to interface with the network 1520. In further examples, the communication Components 1540 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1522 may be another machine or any of a wide variety of peripheral devices (e.g., a peripheral device coupled via a USB).

Moreover, the communication Components 1540 may detect identifiers or include Components operable to detect identifiers. For example, the communication Components 1540 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals).

In addition, a variety of information may be derived via the communication Components 1540, such as location via Internet Protocol (IP) geolocation, location via Wi-Fi® signal triangulation, location via detecting an NFC beacon signal that may indicate a particular location, and so forth.

The various memories (e.g., memory 1504, main memory 1512, static memory 1514, and/or memory of the Processors 1502) and/or storage unit 1516 may store one or more sets of instructions and data structures (e.g., software) embodying or used by any one or more of the methodologies or functions described herein. These instructions (e.g., the instructions 1508), when executed by Processors 1502, cause various operations to implement the disclosed embodiments.

The instructions 1508 may be transmitted or received over the network 1520, using a transmission medium, via a network interface device (e.g., a network interface Component included in the communication Components 1540) and using any one of a number of well-known transfer protocols (e.g., hypertext transfer protocol (HTTP)). Similarly, the instructions 1508 may be transmitted or received using a transmission medium via the coupling 1526 (e.g., a peer-to-peer coupling) to the devices 1522.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Described implementations of the subject matter can include one or more features, alone or in combination as illustrated below by way of example.

Example 1 is a method comprising: forming training data comprising bending estimates of a flexible device worn by a first user; training a model based on the training data; and generating reference biometric data for the first user based on the model.

Example 2 includes the method of example 1, further comprising: estimating a bending of the flexible device over a plurality of sessions, each session comprising a wearing of the flexible device by the first user; and forming the bending estimates based on the bending over the plurality of sessions.

Example 3 includes the method of example 1, wherein the reference biometric data indicate a range of acceptable bending estimates for the first user.

Example 4 includes the method of example 1, further comprising: detecting a wearing of the flexible device by a second user, and an operation of an augmented reality (AR) application of an account associated with the first user at the flexible device; estimating a bending of the flexible device worn by the second user; authenticating the second user based on the bending estimate of the second user and the biometric data of the first user; and in response to the second user being authenticated, granting the second user, access to the AR application of the account associated with the first user.

Example 5 includes the method of example 1, further comprising: detecting a wearing of the flexible device by a second user, and an operation of an augmented reality (AR) application of an account associated with the first user at the flexible device; estimating a bending of the flexible device worn by the second user; determining that the bending estimate of the flexible device worn by the second user does not match the reference biometric data of the first user; and denying the second user, access to the AR application of the account associated with the first user.

Example 6 includes the method of example 1, further comprising: detecting a wearing of the flexible device by a second user, and an operation of an augmented reality (AR) application of an account associated with the first user at the flexible device; estimating a bending of the flexible device worn by the second user; determining that the bending estimate of the flexible device worn by the second user does not match the biometric data of the first user; retrieving additional biometric data of the second user based on sensors of the flexible device; and authenticating the second user based on the additional biometric data of the second user and additional reference biometric data of the first user.

Example 7 includes the method of example 6, wherein the additional biometric data comprises at least one of voice-based biometric data, an iris-based biometric data, or a facial-based biometric data.

Example 8 includes the method of example 1, wherein the flexible device is head-worn and comprises: a left temple, a right temple, and a frame, wherein the bending estimates comprise: a bending of the left temple with respect to the frame or the right temple; and a bending of the right temple with respect to the frame or the left temple.

Example 9 includes the method of example 1, wherein the bending estimates comprise combination of a pitch-roll bending estimate and a yaw bending estimate.

Example 10 includes the method of example 8, wherein the bending estimates are based on comparing a left image from a left camera mounted on the left temple with a right image from a right camera mounted on the right temple, VIO data of the flexible device, and a depth map based on the left image and the right image.

Example 11 is a computing apparatus comprising: a processor; and a memory storing instructions that, when executed by the processor, configure the apparatus to: form training data comprising bending estimates of a flexible device worn by a first user; train a model based on the training data; and generate reference biometric data for the first user based on the model.

Example 12 includes the computing apparatus of example 11, wherein the instructions further configure the apparatus to: estimate a bending of the flexible device over a plurality of sessions, each session comprising a wearing of the flexible device by the first user; and form the bending estimates based on the bending over the plurality of sessions.

Example 13 includes the computing apparatus of example 11, wherein the reference biometric data indicate a range of acceptable bend estimates for the first user.

Example 14 includes the computing apparatus of example 11, wherein the instructions further configure the apparatus to: detect a wearing of the flexible device by a second user, and an operation of an augmented reality (AR) application of an account associated with the first user at the flexible device; estimate a bending of the flexible device worn by the second user; authenticate the second user based on the bending estimate of the second user and the biometric data of the first user; and in response to the second user being authenticated, grant the second user, access to the AR application of the account associated with the first user.

Example 15 includes the computing apparatus of example 11, wherein the instructions further configure the apparatus to: detect a wearing of the flexible device by a second user, and an operation of an augmented reality (AR) application of an account associated with the first user at the flexible device; estimate a bending of the flexible device worn by the second user; determine that the bending estimate of the flexible device worn by the second user does not match the reference biometric data of the first user; and deny the second user, access to the AR application of the account associated with the first user.

Example 16 includes the computing apparatus of example 11, wherein the instructions further configure the apparatus to: detect a wearing of the flexible device by a second user, and an operation of an augmented reality (AR) application of an account associated with the first user at the flexible device; estimate a bending of the flexible device worn by the second user; determine that the bending estimate of the flexible device worn by the second user does not match the biometric data of the first user; retrieve additional biometric data of the second user based on sensors of the flexible device; and authenticate the second user based on the additional biometric data of the second user and additional reference biometric data of the first user.

Example 17 includes the computing apparatus of example 16, wherein the additional biometric data comprises at least one of voice-based biometric data, an iris-based biometric data, or a facial-based biometric data.

Example 18 includes the computing apparatus of example 11, wherein the flexible device is head-worn and comprises: a left temple, a right temple, and a frame, wherein the bending estimates comprise: a bending of the left temple with respect to the frame or the right temple; and a bending of the right temple with respect to the frame or the left temple.

Example 19 includes the computing apparatus of example 11, wherein the bending estimates comprise combination of a pitch-roll bend estimate and a yaw bending estimate.

Example 20 is non-transitory computer-readable storage medium, the computer-readable storage medium including instructions that when executed by a computer, cause the computer to: form training data comprising bending estimates of a flexible device worn by a first user; train a model based on the training data; and generate reference biometric data for the first user based on the model.

What is claimed is:

1. A method comprising: forming training data comprising bending estimates of a flexible device worn by a first user, the bending estimates indicating how deformed the flexible device is and being derived from physiological characteristics of the first user; training a model based on the training data using a machine learning algorithm configured to transform the bending estimates into a biometric profile unique to the first user; and generating reference biometric data for the first user based on the model; wherein the flexible device is head-worn and comprises: a left temple, a right temple, and a frame, wherein the bending estimates comprise: a bending of the left temple with respect to the frame or the right temple; and a bending of the right temple with respect to the frame or the left temple; wherein the bending estimates are based on comparing a left image from a left camera mounted on the left temple with a right image from a right camera mounted on the right temple, VIO data of the flexible device, and a depth map based on the left image and the right image.

2. The method of claim 1, further comprising: estimating a bending of the flexible device over a plurality of sessions, each session comprising a wearing of the flexible device by the first user; and forming the bending estimates based on the bending over the plurality of sessions.

3. The method of claim 1, wherein the reference biometric data indicate a range of acceptable bending estimates for the first user, wherein the acceptable range is defined as a preset number of degrees from an established baseline bending measurement calibrated to the first user's physiological geometry, and wherein the acceptable range is determined using a calibration process that accounts for the first user's head size, shape, and other physiological characteristics.

4. The method of claim 1, further comprising: detecting a wearing of the flexible device by a second user, and an operation of an augmented reality (AR) application of an account associated with the first user at the flexible device; estimating a bending of the flexible device worn by the second user; authenticating the second user based on the bending estimate of the second user and the biometric data of the first user; and in response to the second user being authenticated, granting the second user, access to the AR application of the account associated with the first user.

5. The method of claim 1, further comprising: detecting a wearing of the flexible device by a second user, and an operation of an augmented reality (AR) application of an account associated with the first user at the flexible device; estimating a bending of the flexible device worn by the second user; determining that the bending estimate of the flexible device worn by the second user does not match the reference biometric data of the first user; and denying the second user, access to the AR application of the account associated with the first user.

6. The method of claim 1, further comprising: detecting a wearing of the flexible device by a second user, and an operation of an augmented reality (AR) application of an account associated with the first user at the flexible device; estimating a bending of the flexible device worn by the second user; determining that the bending estimate of the flexible device worn by the second user does not match the biometric data of the first user; retrieving additional biometric data of the second user based on sensors of the flexible device; and authenticating the second user based on the additional biometric data of the second user and additional reference biometric data of the first user.

7. The method of claim 6, wherein the additional biometric data comprises at least one of voice-based biometric data, an iris-based biometric data, or a facial-based biometric data.

8. The method of claim 1, wherein the bending estimates comprise combination of a pitch-roll bending estimate and a yaw bending estimate.

9. A computing apparatus comprising: a processor; and a memory storing instructions that, when executed by the processor, configure the apparatus to perform operations comprising: forming training data comprising bending estimates of a flexible device worn by a first user, the bending estimates indicating how deformed the flexible device is and being derived from physiological characteristics of the first user; training a model based on the training data using a machine learning algorithm configured to transform the bending estimates into a biometric profile unique to the first user; and generating reference biometric data for the first user based on the model wherein the flexible device is head-worn and comprises: a left temple, a right temple, and a frame, wherein the bending estimates comprise: a bending of the left temple with respect to the frame or the right temple; and a bending of the right temple with respect to the frame or the left temple; wherein the bending estimates are based on comparing a left image from a left camera mounted on the left temple with a right image from a right camera mounted on the right temple, VIO data of the flexible device, and a depth map based on the left image and the right image.

10. The computing apparatus of claim 9, wherein the instructions further configure the apparatus to: estimate a bending of the flexible device over a plurality of sessions, each session comprising a wearing of the flexible device by the first user; and form the bending estimates based on the bending over the plurality of sessions.

11. The computing apparatus of claim 9, wherein the reference biometric data indicate a range of acceptable bend estimates for the first user, wherein the acceptable range is defined as a preset number of degrees from an established baseline bending measurement calibrated to the first user's physiological geometry, and wherein the acceptable range is determined using a calibration process that accounts for the first user's head size, shape, and other physiological characteristics.

12. The computing apparatus of claim 9, wherein the instructions further configure the apparatus to: detect a wearing of the flexible device by a second user, and an operation of an augmented reality (AR) application of an account associated with the first user at the flexible device; estimate a bending of the flexible device worn by the second user; authenticate the second user based on the bending estimate of the second user and the biometric data of the first user; and in response to the second user being authenticated, grant the second user, access to the AR application of the account associated with the first user.

13. The computing apparatus of claim 9, wherein the instructions further configure the apparatus to: detect a wearing of the flexible device by a second user, and an operation of an augmented reality (AR) application of an account associated with the first user at the flexible device; estimate a bending of the flexible device worn by the second user; determine that the bending estimate of the flexible device worn by the second user does not match the reference biometric data of the first user; and deny the second user, access to the AR application of the account associated with the first user.

14. The computing apparatus of claim 9, wherein the instructions further configure the apparatus to:
  detect a wearing of the flexible device by a second user, and an operation of an augmented reality (AR) application of an account associated with the first user at the flexible device;
  estimate a bending of the flexible device worn by the second user;

determine that the bending estimate of the flexible device worn by the second user does not match the biometric data of the first user;

retrieve additional biometric data of the second user based on sensors of the flexible device; and authenticate the second user based on the additional biometric data of the second user and additional reference biometric data of the first user.

15. The computing apparatus of claim 14, wherein the additional biometric data comprises at least one of voice-based biometric data, an iris-based biometric data, or a facial-based biometric data.

16. The computing apparatus of claim 9, wherein the bending estimates comprise combination of a pitch-roll bend estimate and a yaw bending estimate.

17. A non-transitory computer-readable storage medium, the computer-readable storage medium including instructions that when executed by a computer, cause the computer to perform operations comprising: forming training data comprising bending estimates of a flexible device worn by a first user, the bending estimates indicating how deformed the flexible device is and being derived from physiological characteristics of the first user; training a model based on the training data using a machine learning algorithm configured to transform the bending estimates into a biometric profile unique to the first user; and generating reference biometric data for the first user based on the model wherein the flexible device is head-worn and comprises: a left temple, a right temple, and a frame, wherein the bending estimates comprise: a bending of the left temple with respect to the frame or the right temple; and a bending of the right temple with respect to the frame or the left temple; wherein the bending estimates are based on comparing a left image from a left camera mounted on the left temple with a right image from a right camera mounted on the right temple, VIO data of the flexible device, and a depth map based on the left image and the right image.

* * * * *